United States Patent
Lee (10) Patent No.: US 7,602,688 B2
(45) Date of Patent: Oct. 13, 2009

(54) METHOD FOR DETERMINING DISC TYPE IN OPTICAL DISC DEVICE

(75) Inventor: Jong Hyeok Lee, Pyungtaek-si (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 564 days.

(21) Appl. No.: 10/986,655

(22) Filed: Nov. 12, 2004

(65) Prior Publication Data

US 2005/0099919 A1 May 12, 2005

(30) Foreign Application Priority Data

Nov. 11, 2003 (KR) .................. 10-2003-0079524

(51) Int. Cl.
G11B 7/00 (2006.01)
(52) U.S. Cl. ............... 369/53.37; 369/53.2; 369/53.45
(58) Field of Classification Search .............. None
See application file for complete search history.

(56) References Cited

U.S. PATENT DOCUMENTS

| | | | |
|---|---|---|---|
| 6,188,657 B1 * | 2/2001 | Kim et al. | 369/53.11 |
| 6,434,087 B1 * | 8/2002 | Schell et al. | 369/13.02 |
| 7,075,873 B2 * | 7/2006 | Ito | 369/53.2 |
| 7,154,831 B2 * | 12/2006 | Yanagawa et al. | 369/53.19 |
| 2001/0002223 A1 | 5/2001 | Watanabe | |
| 2005/0111334 A1 * | 5/2005 | Cookson et al. | 369/94 |

FOREIGN PATENT DOCUMENTS

| | | | |
|---|---|---|---|
| EP | 0969458 A | | 1/2000 |
| EP | 0969458 A1 * | | 1/2000 |
| EP | 1347451 A | | 9/2003 |
| KR | 10-1994-0022484 A | | 10/1994 |

* cited by examiner

Primary Examiner—Wayne R Young
Assistant Examiner—Adam R Giesy
(74) Attorney, Agent, or Firm—Birch, Stewart, Kolasch & Birch, LLP (57) ABSTRACT

A method for determining disc type in an optical disc device is provided. The device performs a disc initialization procedure for a disc loaded into the device, assuming that the loaded disc type is a preset disc type, and checks whether or not the initialization procedure fails. If the initialization procedure fails, the device performs a series of disc type determination operations to determine the loaded disc type. The device cumulatively stores the initialized disc type or the determined disc type, and updates the preset disc type using cumulative frequency distribution of the stored disc types. The user may also select the loaded disc type by manipulating a switch provided on the optical disc device. The device can quickly determine the loaded disc type, reducing the time the user must wait until a desired operation is performed.

19 Claims, 6 Drawing Sheets

RELATED ART

Knob SW 1

Knob SW 2

METHOD FOR DETERMINING DISC TYPE IN OPTICAL DISC DEVICE

BACKGROUND OF THE INVENTION

1. Field of the Invention

The present invention relates to a method for determining disc type in an optical disc device, and more particularly to a method for efficiently determining the type of an optical disc inserted into a multi-disc device capable of reproducing and/or recording data in a manner suitable for various optical discs such as CDs or DVDs.

2. Description of the Related Art

Various types of optical discs capable of recording or storing high quality, long duration audio and video data are in widespread use. An optical disc device such as a multi-disc recorder capable of reproducing or recording data on the various types of optical discs has been commercialized.

Figure 1:
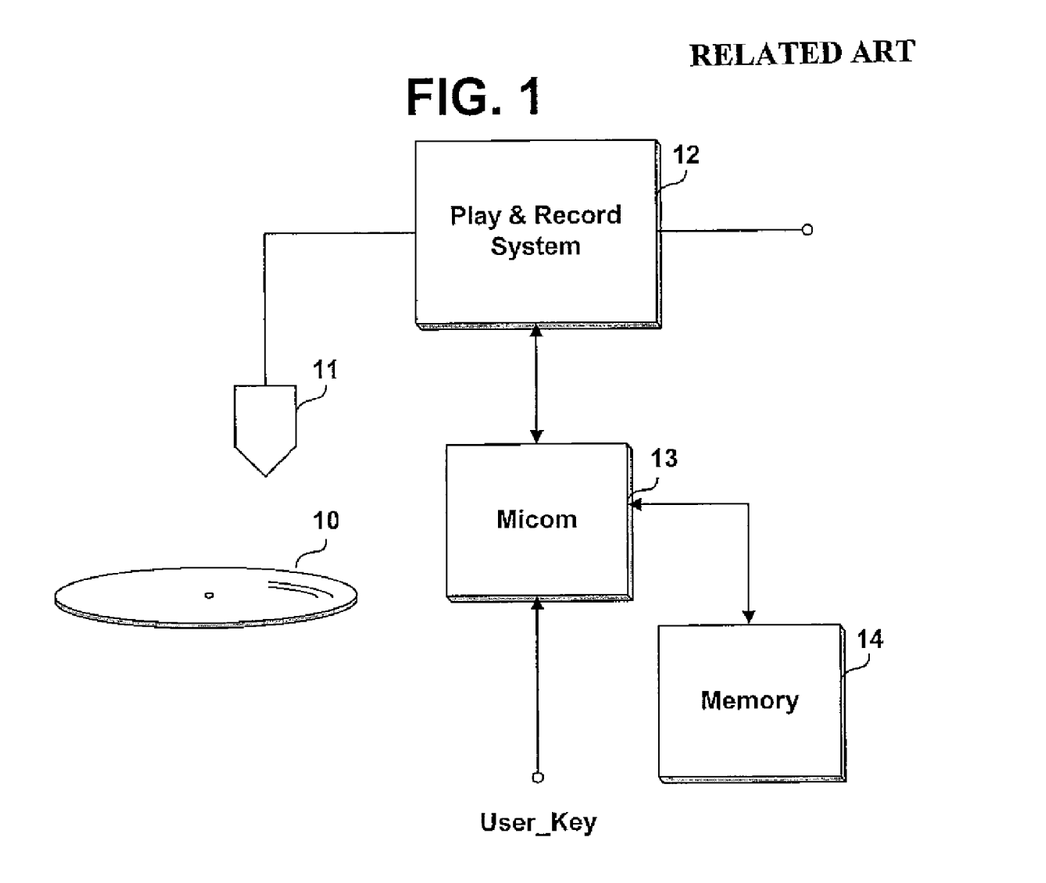
FIG. 1 is a block diagram illustrating the configuration of a general optical disc device.

As shown in FIG. 1, the optical disc device such as the multi-disc recorder includes an optical pickup 11 for accessing an optical disc 10, a play & record system 12, a microcomputer 13, and a memory 14. The microcomputer 13 performs a series of operations for determining the type of the optical disc 10 inserted into the optical disc device.

The microcomputer 13 determines the type of the optical disc inserted into the optical disc device, for example, it determines whether the type of the optical disc 10 inserted in the device is CD-ROM, CD-R or CD-RW in the CD family, or DVD-ROM, DVD-R, DVD+R, DVD-RW, DVD+RW or DVD-RAM in the DVD family, and then performs a series of disc initialization operations, such as a servo operation and an information read operation, suitable for the determined disc type.

Figure 2:
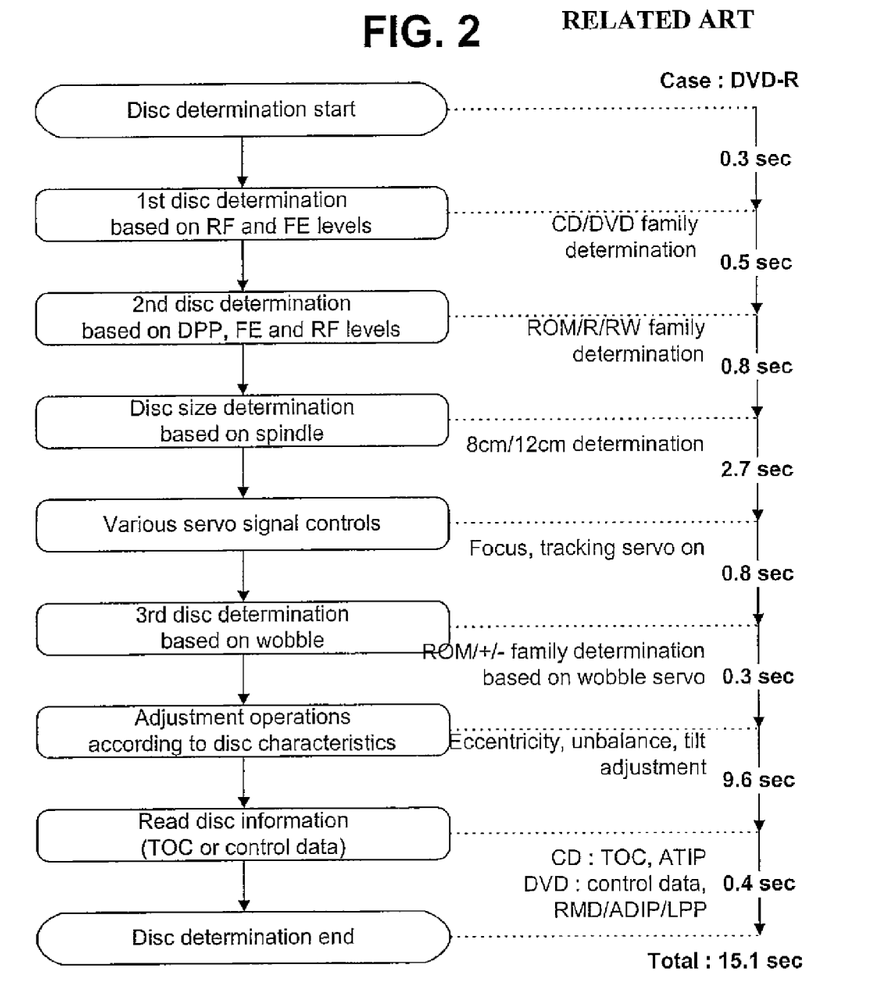
FIG. 2 is a flow chart illustrating a disc type determination procedure in a general optical disc device according to a related art.

FIG. 2 is a flow chart illustrating a disc type determination procedure according to a related art. If the disc type determination procedure is started, for example, with a DVD-R loaded in the optical disc device as shown in FIG. 2, the microcomputer 13 performs a first disc type determination operation in which it detects the level of a Focus Error (FE) signal and Radio Frequency (RF) signal to determine whether the loaded disc belongs to the CD or DVD family. If the detected level is high, the microcomputer 13 determines that the loaded disc belongs to the CD family. If the detected level is low, the microcomputer 13 determines that the loaded disc belongs to the DVD family. In this example, the microcomputer determines that the loaded disc belongs to the DVD family.

With the loaded disc determined to belong to the DVD family, the microcomputer 13 performs a second disc type determination operation in which it detects the level of DPP, FE and RF signals to determine whether the loaded disc belongs to the DVD-ROM, DVD-R or DVD-RW family. After the second disc type determination operation, the microcomputer 13 checks a rotation state of a spindle motor in the optical disc device to determine the size of the loaded disc ("8 cm" from among two possible disc sizes of "8 cm" and "12 cm" in this example), and then controls focus and tracking servos.

While the focus and tracking servos are activated, the microcomputer 13 performs a third disc type determination operation in which it determines, based on the disc wobble form, whether the loaded disc belongs to the DVD-R, DVD+R, DVD-RW, or DVD+RW family. After the third disc type determination operation, the microcomputer 13 performs adjustment operations according to the disc characteristics such as disc eccentricity, unbalance, tilt and the like, and performs a disc information read operation. For example, if the loaded disc type is CD, the microcomputer 13 reads disc information such as TOC (Table of Contents) information, ATIP (Absolute Time in Pregroove) information and the like, and if the loaded disc type is DVD, the microcomputer 13 reads disc information such as RMD, (Record Management Data), ADIP and LPP information, and control data.

In the general optical disc device, however, it takes a long time (for example, a total of 15.1 seconds for DVD-R) to determine the type of an optical disc inserted into the device since it must sequentially perform a number of the disc type determination operations as described above. Thus, a user must wait a long time until an operation or function desired by the user can actually start.

SUMMARY OF THE INVENTION

Therefore, the present invention has been made in view of the above and other problems, and it is an object of the present invention to provide a method for efficiently and quickly determining the type of an optical disc inserted into a multi-disc device capable of reproducing or recording data on various types of optical discs.

In accordance with the present invention, the above and other objects can be accomplished by the provision of a method for determining disc type in an optical disc device, in which the device performs a disc initialization procedure for a disc loaded into the device, assuming that the loaded disc type is a preset disc type, and checks whether or not the initialization procedure fails, and then performs a disc type determination procedure to determine the loaded disc type if the initialization procedure fails.

According to an aspect of the present invention, the optical disc device cumulatively stores the initialized disc type or the determined disc type, and updates the preset disc type based on the cumulative frequency distribution of the stored disc types. In one embodiment of the present invention, a user may also select the disc type of the loaded disc by manipulating a switch provided on the optical disc device.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFFERRED EMBODIMENTS

Preferred embodiments of a method for determining disc type in an optical disc device according to the present invention will now be described in detail with reference to the accompanying drawings.

The disc type determination method according to the present invention can be applied to an optical disc device, such as a multi-disc recorder, configured as described above with reference to FIG. 1, or to other suitable devices and systems.

Figure 3:
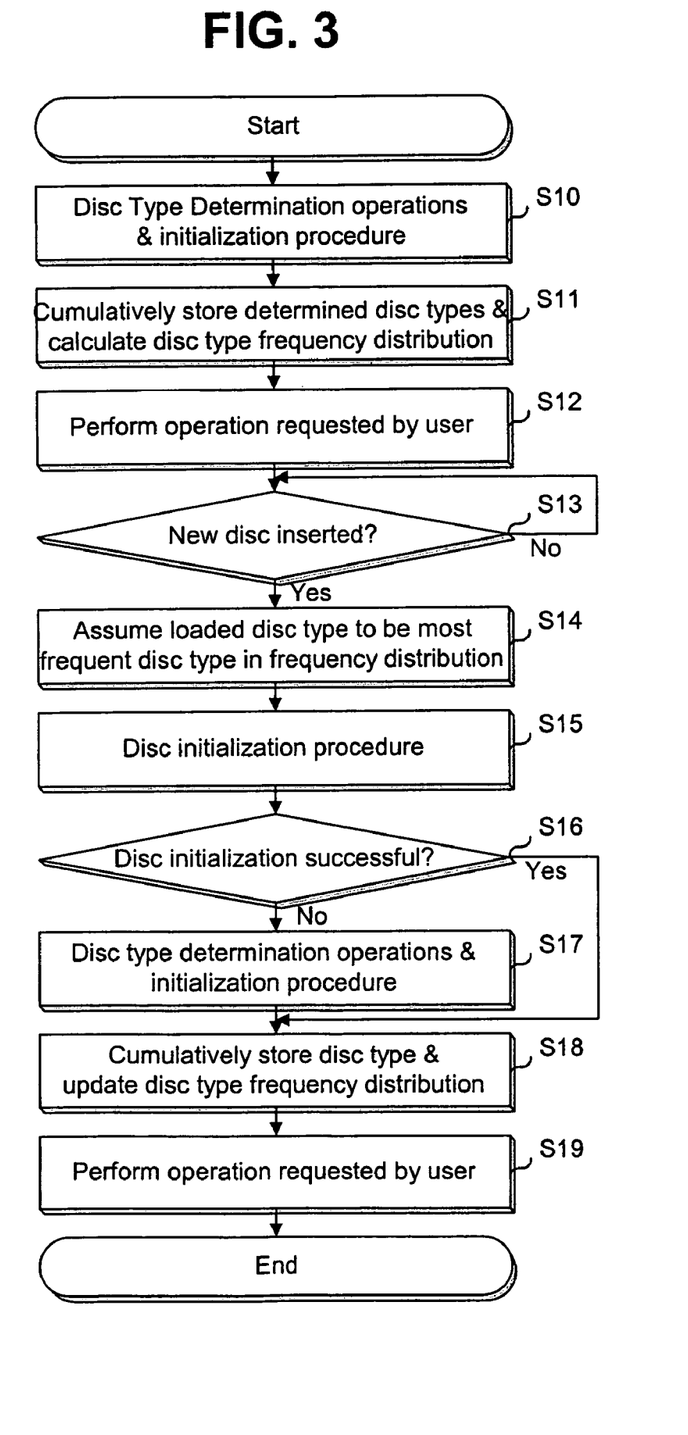
FIG. 3 is a flow chart illustrating a disc type determination method in an optical disc device according to an embodiment of the present invention.

FIG. 3 is a flow chart illustrating a disc type determination method in an optical disc device according to the present invention.

Referring to FIG. 3, the microcomputer 13 performs a series of disc type determination operations and an initialization procedure as known, e.g., as shown in FIG. 2 (S10), and cumulatively stores the determined disc types as disc type determination results in the memory 14, and calculates a cumulative frequency distribution of the determined disc types stored in the memory 14 (S11). The microcomputer 13 then performs an operation desired by a user such as disc playback or recording (S12).

If the user inserts a new optical disc into the optical disc device (S13), the microcomputer 13 checks the cumulative frequency distribution of the determined disc types as stored in the memory 14, and assumes that the type of the new optical disc is the most frequent disc type in the cumulative frequency distribution (S14). That is, the microcomputer 13 identifies the most frequently inserted disc by examining the stored cumulative frequency distribution and assumes that the currently inserted disc is of that type.

The microcomputer 13 then performs a disc initialization procedure with a focus and tracking servo operation corresponding to the assumed disc type (S15). If the disc initialization procedure is not normally performed (i.e., it is not successfully performed) (S16), the microcomputer 13 performs a series of disc type determination operations as described above with reference to FIG. 2 to actually determine the type of the newly inserted optical disc, and performs a disc initialization procedure corresponding to the determined disc type (S17). On the other hand, if the disc initialization procedure is normally performed (i.e., it is successful) with the focus and tracking servo operation corresponding to the assumed disc type (S17), the microcomputer 13 omits the series of disc type determination operations of step S17 and proceeds to step S18.

The disc type of the newly inserted disc (as correctly identified based on the assumption or actual determination) is cumulatively stored in the memory, thereby updating the cumulative frequency distribution of the disc types stored in the memory (S18). The microcomputer 13 then performs a function and/or operation desired by the user (S19). This disc type determination method of FIG. 3 reduces the time required to determine the disc type, thereby efficiently reducing the time the user must wait until an operation or function desired by the user is activated.

Figure 4:
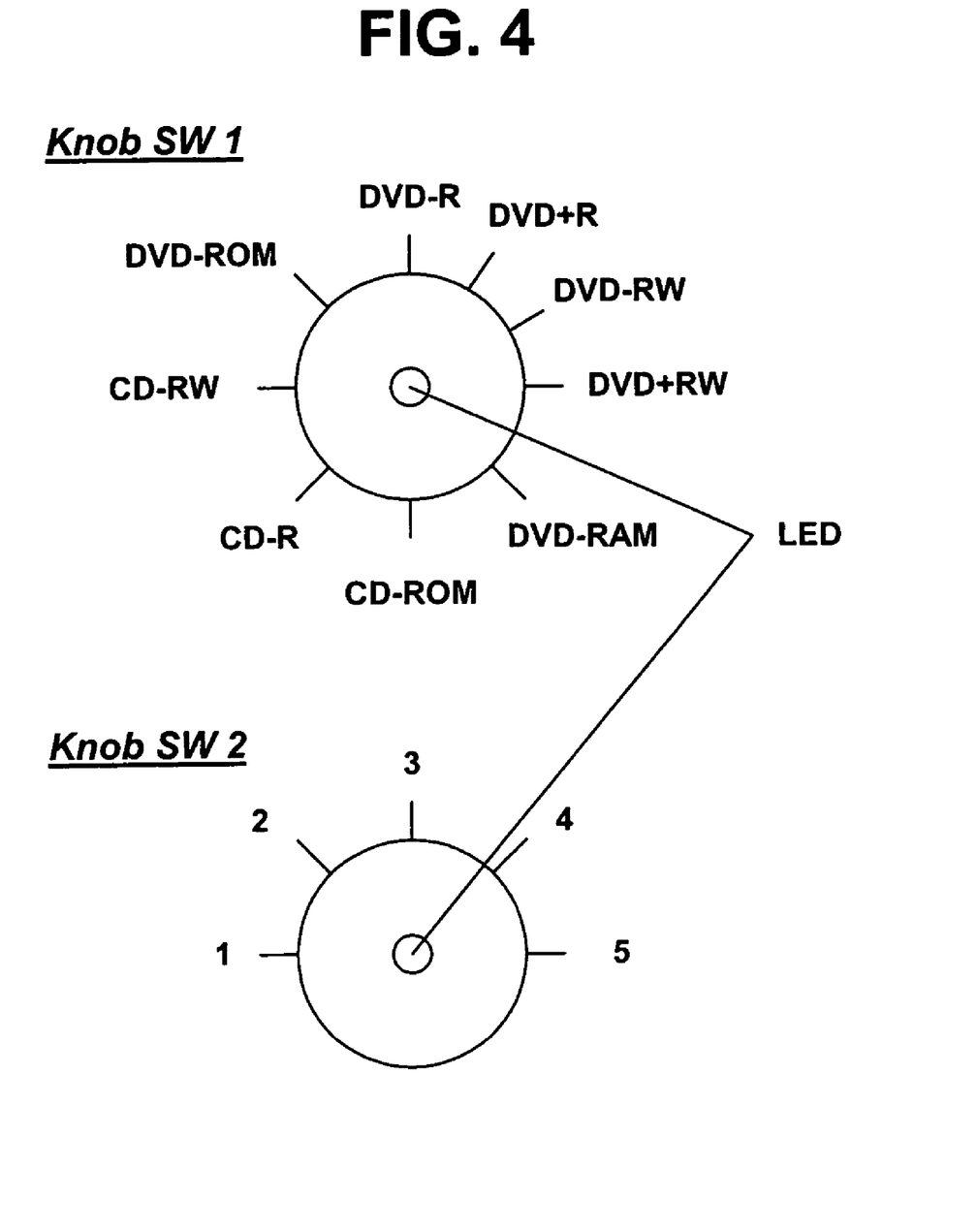
FIG. 4 illustrates examples of first and second knob switches provided on an optical disc device according to an embodiment of the present invention.

According to another embodiment of the present invention, a first (SW1) or second (SW2) knob switch is provided as shown in FIG. 4, which enables the user to specify the type of disc when they insert the disc into the optical disc device. The first or second knob switch can be provided on the optical disc device such as the device in FIG. 1, and is operatively coupled to the internal components (e.g., the Microm 13) of the optical disc device to implement the disc type determining methods of the invention as described below.

For each of the first and second knob switches SW1 and SW2, the knob can be operated to make a selection among selectable items. As shown in FIG. 4, the first knob switch SW1 can have a selection of DVD-ROM, DVD-R, DVD+R, DVD-RW, DVD+RW, DVD-RAM, CD-ROM, CD-R, or CD-RW. The second knob switch SW2 can have a selection of switch numbers 1, 2, 3, 4 or 5. These are examples only and the present invention encompasses other examples and other variations. Further, although knobs are shown in FIG. 4, other types of switches or selecting mechanisms can be used. The use of the first or second knob switch efficiently reduces the time required to determine the disc type.

Figure 5:
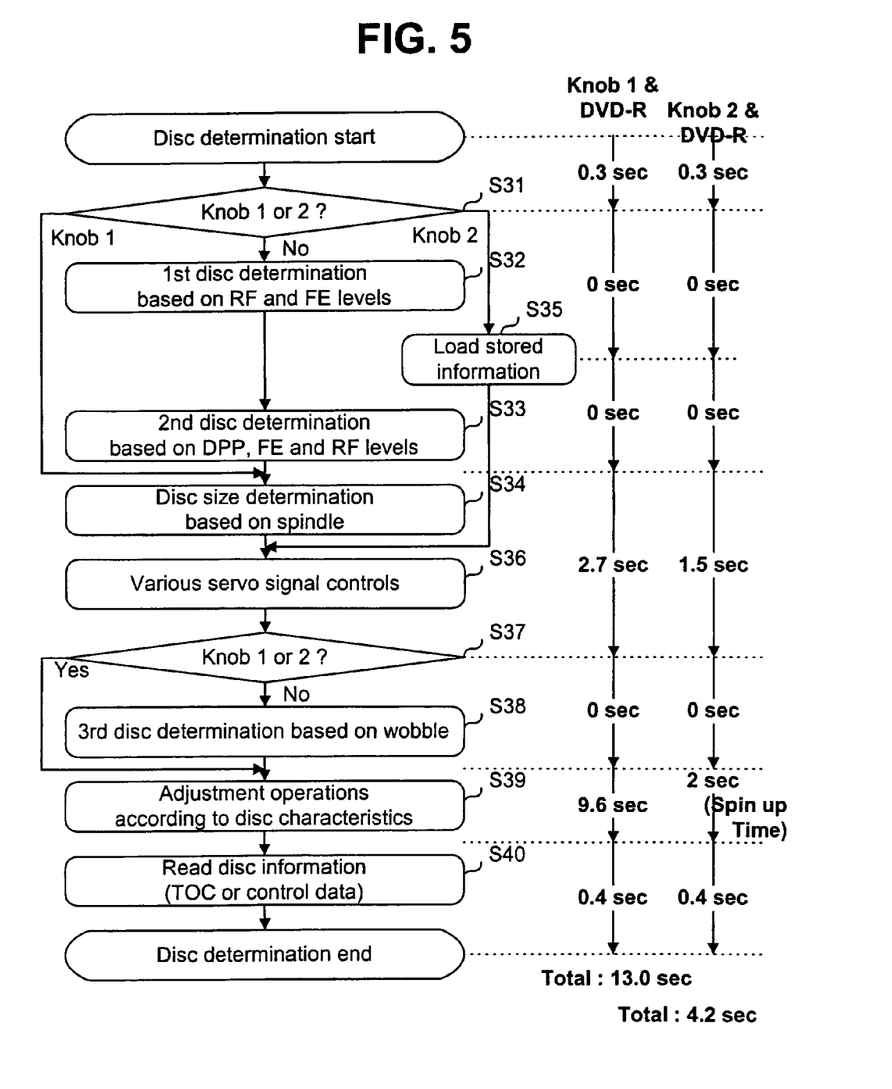
FIG. 5 is a flow chart illustrating a method for determining disc type using the first or second knob switch according to an embodiment of the present invention.

FIG. 5 is a flow chart illustrating a method for determining disc type using the first or second knob switch (e.g. SW1 or SW2 of FIG. 4) according to the present invention. The method of FIG. 5 can be implemented by the optical disc device of FIG. 1 or other suitable device/system.

Referring to FIG. 5, if the user specifies the disc type using the first knob switch (SW1) (S31), the microcomputer 13 omits the first and second disc type determination operations in the conventional disc type determination procedure shown in FIG. 2, and checks the rotation state of the spindle motor, determines whether the disc size is 12 cm or 8 cm, and controls the focus and tracking servo operations accordingly (S34 and S36).

If no first or second knob switch is used or selected, the method performs the first and second disc type determination operations in the conventional disc type determination procedure as shown in FIG. 2 (S32 and S33) and proceeds to step S34.

If the user at step S31 specifies the disc type using the second knob switch (SW2), the microcomputer 13 omits the first and second disc type determination operations and the disc size determination operation in the conventional disc type determination procedure shown in FIG. 2, and loads or reads information (for example, disc type information) stored in association with a selected switch number of the second knob switch and directly controls the focus and tracking servo operations accordingly (S35 and S36).

If the user specifies the disc type using the first or second knob switch (S37), the microcomputer 13 also omits the third disc type determination operation in the conventional disc type determination procedure shown in FIG. 2, and performs adjustment operations according to disc characteristics such as disc eccentricity, unbalance, tilt and the like (S39), and then performs a disc information read operation (S40). If no first or second knob switch is used or selected at step S37, the method performs the third disc type determination operation in the conventional disc type determination procedure as shown in FIG. 2 (S38) and proceeds to step S39.

The use of the first or second knob switch to specify the disc type allows the disc type determination procedure to be terminated more quickly than the conventional disc type determination method. For example, for a DVD-R optical disc, it takes 15.1 seconds to determine the disc type according to the conventional method, whereas it takes, e.g., about 13.0 seconds when using the first knob switch and about 4.2 seconds when using the second knob switch according to the present invention.

If the inserted disc is not identical to the disc type specified using the first or second switch, the disc initialization procedure would not be normally performed. The microcomputer 13 thus checks whether or not the disc initialization procedure is normally performed. If the disc initialization procedure is not normally performed, the microcomputer 13 again performs a series of disc type determination operations as described above with reference to FIG. 2 to actually determine the type of the inserted disc, and performs a disc initialization procedure corresponding to the determined disc type.

Figure 6:
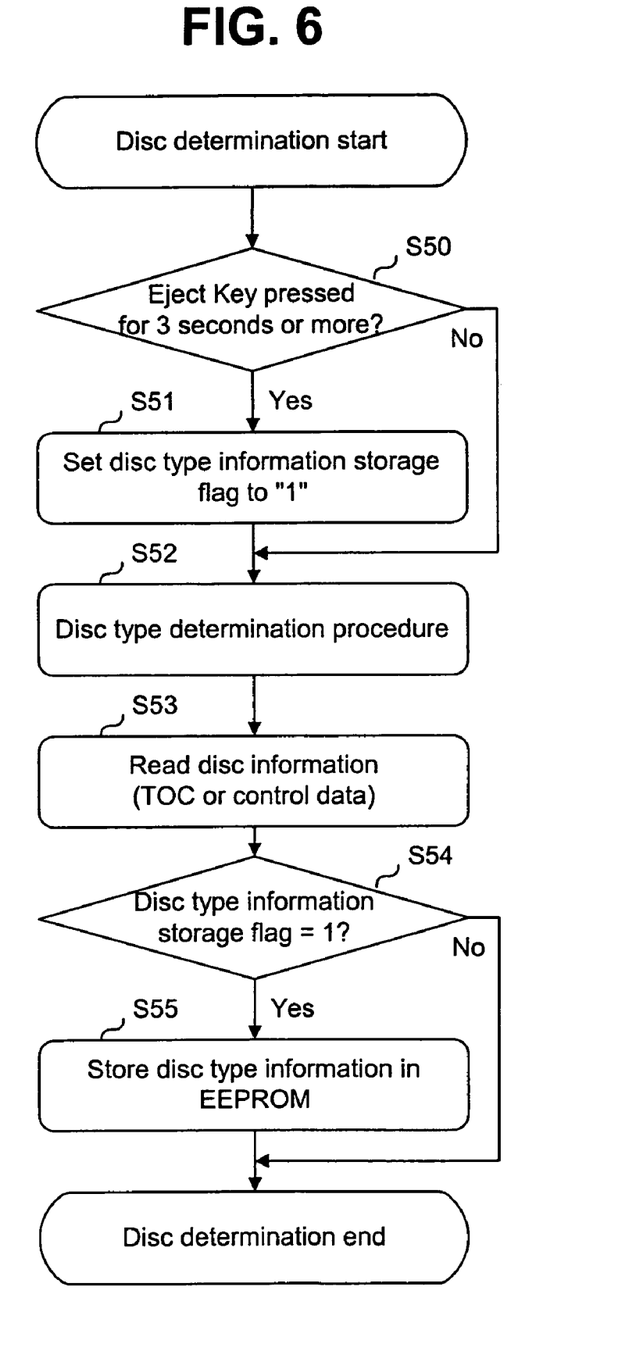
FIG. 6 is a flow chart illustrating how disc type information is stored in association with each switch number provided on the second knob switch according to an embodiment of the present invention.

FIG. 6 is a flow chart illustrating how disc type information is stored in association with each switch number provided on the second knob switch (e.g., SW2 in FIG. 4) according to an embodiment of the present invention. The method of FIG. 6 can be implemented in the optical disc device of FIG. 1 or other suitable device/system.

Referring to FIG. 6, first, the user adjusts the second knob switch to a number "1". The user inserts an optical disc into the optical disc device having the second knob switch set to the number "1". If the user presses an eject key provided on the optical disc device for 3 seconds or more when the optical disc is being inserted into the optical disc device (S50), the microcomputer 13 sets a flag indicating disc type information storage to "1" (S51). The microcomputer 13 then performs a series of disc type determination operations (S52), and performs a disc information read operation according to the determination results (S53).

Thereafter, the microcomputer 13 checks whether or not the disc type information storage flag is set to "1" (S54). If the flag is set to "1", the microcomputer stores the information of the disc type determined in the disc type determination procedure at step S52 as described above, in association with the set switch number "1", in a memory, for example, a nonvolatile memory such as an EEPROM in the optical disc device (S55). In this manner, information of different disc types can be stored in association with the first to fifth numbers "1" to "5" provided on the second knob switch and subsequently used to more quickly access a newly inserted disc type as the user selects a switch number from the numbers 1-5 of the second knob switch.

As apparent from the above description, the present invention provides a method for determining disc type in an optical disc device, which allows the type of an optical disc inserted in the device to be determined more quickly and efficiently, thereby efficiently reducing waiting time so that an operation or function desired by the user can be more quickly activated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for determining disc type in an optical disc device capable of recording and/or reproducing data on various types of discs, the method comprising:
   (a) storing cumulatively disc types of previously inserted optical discs;
   (b) generating a cumulative frequency distribution of the stored disc types;
   (c) selecting, among all of the disc types of the previously inserted optical discs, a disc type corresponding to the most frequent disc type in the cumulative frequency distribution;
   (d) performing an initialization procedure corresponding to a preset disc type for a disc loaded in the optical disc device, wherein the initialization procedure corresponding to the preset disc type is an initialization procedure corresponding to the selected disc type; and
   (e) performing a disc type determination procedure to determine a disc type of the loaded disc if the initialization procedure fails,
   wherein the steps (a) - (e) are performed each time a disc is loaded in the optical disc device.

2. The method according to claim 1, further comprising:
   updating the preset disc type in view of the disc type of the initialized disc.

3. The method according to claim 1, wherein the initialization procedure is performed without determining the type of the disc loaded in the optical disc device.

4. The method according to claim 1, wherein the preset disc type is set by a selection of the optical disc device from a user.

5. The method according to claim 4, wherein the selection of the user is performed through a manipulation of a switch provided on the optical disc device.

6. The method according to claim 5, further comprising:
   assigning, by a user, selectable items of the switch to different disc types of optical discs inserted into the optical disc devices, such that an operation on a particular disc can be performed by selecting one of the selectable items of the switch to correspond to a disc type of the particular disc.

7. The method according to claim 6, wherein the assigning is performed by using an eject switch on the optical disc device.

8. The method according to claim 4, wherein the initialization procedure is performed without determining the type of the disc loaded in the optical disc device based on the selection of the user.

9. A method for determining disc type in an optical disc device, the method comprising:
   (a) generating a cumulative frequency distribution of various types of discs previously inserted into the optical disc device;
   (b) selecting, among all of the various types of discs previously inserted into the optical disc device, a disc type corresponding to the most frequently present disc type in the cumulative frequency distribution; and
   (c) performing a procedure on a newly inserted disc by assuming that the newly inserted disc type is the selected disc types,
   wherein the steps (a) - (c) are performed each time a disc is inserted into the optical disc device.

10. The method according to claim 9, further comprising:
    determining a disc type of the newly inserted disc if the procedure is not successfully performed; and
    performing the procedure based on the determined disc type of the newly inserted disc.

11. An optical disc device comprising:
    a recording/reproducing part to record/reproduce data from an optical disc inserted into the optical disc device;
    a storing unit for storing cumulative disc types of previously inserted optical discs;
    a switch for a manual selection of a disc type of a disc inserted into the optical disc device; and
    a controller for controlling the recording/reproducing part in response to an output from the switch,
    wherein the controller, each time a disc is loaded in the optical disc device, performs an initialization procedure corresponding to a preset disc type for the disc loaded in the optical disc device, performs a disc type determination procedure to determine a disc type of the loaded disc of the initialization procedure fails, generates a cumulative frequency distribution of the stored disc types, and selects, among all of the disc types of the previously inserted optical discs, a disc type corresponding to the most frequent disc type in the cumulative frequency distribution, and wherein the initialization procedure corresponding to the preset disc type is an initialization procedure corresponding to the disc type selected by the controller.

12. The optical disc device of claim 11, wherein the switch is a knob manually operable by a user.

13. The optical disc device of claim 11, wherein the switch is disposed on the optical disc device.

14. The optical disc device of claim 11, further comprising:
a switch unit for assigning selectable items of the switch to different disc types of optical discs.

15. The optical disc device of claim 14, wherein the switch unit for assigning includes an eject switch disposed on the optical disc device.

16. The optical disc device of claim 11, wherein the controller carries out an initialization procedure for a newly inserted disc if no selection of disc type is made by using the switch.

17. The optical disc device of claim 11, wherein the optical disc device is a CD and/or DVD player.

18. An optical disc device comprising:
a recording/reproducing part to record/reproduce data from various types of an optical disk inserted into the optical disc device; and
a controller to control the recording/reproducing part,
wherein the controller, each time a disc is newly inserted into the optical disc device, generates a cumulative frequency distribution of various types of discs previously inserted into the optical disc device, selects, among all of the various types of the discs previously inserted into the optical disc device, a disc type corresponding to the most frequent disc type in the cumulative frequency distribution and performs an initialization procedure on the newly inserted disc by assuming that the newly inserted disc type is the selected disc type.

19. A method for determining disc type in an optical disc device capable of recording and/or reproducing data on various types of discs, the method comprising:
(a) performing series of disc type determination and initialization procedure;
(b) storing cumulatively the determined disc types and calculating a cumulative frequency distribution of the stored disc types;
(c) selecting, among all of the stored disc types, a disc type corresponding to the most frequent disc type in the cumulative frequency distribution;
(d) assuming a type of a newly inserted disc is the selected disc type;
(e) performing a disc initialization procedure corresponding to the assumed disc type;
(f) performing a disc type determination procedure to determine a disc type of the newly inserted disc if the initialization procedure fails; and
(g) updating the cumulative frequency distribution with the disc type of the newly inserted disc,
wherein the steps (a) - (g) are performed each time a disc is inserted into the optical disc device.

* * * * *